(12) United States Patent
Mody et al.

(10) Patent No.: US 9,819,957 B2
(45) Date of Patent: Nov. 14, 2017

(54) METHOD AND APPARATUS FOR DECODING A PROGRESSIVE JPEG IMAGE

(71) Applicant: Texas Instruments Incorporated, Dallas, TX (US)

(72) Inventors: Mihir Narendra Mody, Bangalore (IN); Vipul Paladiya, Bangalore (IN); Kapil Ahuja, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/587,116

(22) Filed: May 4, 2017

(65) Prior Publication Data

US 2017/0238003 A1  Aug. 17, 2017

Related U.S. Application Data

(62) Division of application No. 14/335,099, filed on Jul. 18, 2014, now Pat. No. 9,648,350.

(30) Foreign Application Priority Data

Jul. 22, 2013 (IN) .......................... 3247/CHE/2013

(51) Int. Cl.
*G06K 9/36* (2006.01)
*H04N 19/44* (2014.01)
(Continued)

(52) U.S. Cl.
CPC .......... *H04N 19/44* (2014.11); *H04N 19/124* (2014.11); *H04N 19/423* (2014.11); *H04N 19/625* (2014.11); *H04N 19/70* (2014.11)

(58) Field of Classification Search
CPC ........ H04N 19/40; H04N 19/48; H04N 19/61; H04N 19/625; H04N 19/96; H04N 19/34;
(Continued)

(56) References Cited

U.S. PATENT DOCUMENTS 5,321,776 A    6/1994  Shapiro
8,385,664 B2 * 2/2013  Chen ...................... H04N 19/60
                                                382/232
(Continued)

OTHER PUBLICATIONS

Mihir Mody, Vipul Paladiya and Kapil Ahuja, "Efficient Progressive JPEG Decoding using JPEG Baseline Hardware," IEEE, published in 2013, 4 pages.
Prosecution History for U.S. Appl. No. 14/335,099, filed Jul. 18, 2014, dated Jul. 18, 2014 to Apr. 21, 2017 (158 pages).

*Primary Examiner* — Mekonen Bekele
(74) *Attorney, Agent, or Firm* — Gregory J. Albin; Charles A. Brill; Frank D. Cimino

(57) ABSTRACT

A progressive JPEG (joint photographic experts group) decoder is disclosed. The progressive JPEG decoder includes a processing unit that receives a plurality of progressive scans and generates a plurality of modified progressive scans (MPSs). A baseline JPEG decoder, coupled to the processing unit, includes a Huffman decoder, an inverse quantization unit and an inverse transform unit. The Huffman decoder receives a current MPS and generates a set of transform coefficients corresponding to the current MPS. The processing unit adds a set of transform coefficients corresponding to a previous MPS to the set of transform coefficients corresponding to the current MPS, and the processing unit generates quantization indices. The inverse quantization unit estimates inverse quantization values based on the quantization indices. The inverse transform unit estimates inverse transform decoded values based on the estimated inverse quantization values and generates a set of pixels corresponding to the current MPS.

14 Claims, 4 Drawing Sheets

(51) Int. Cl.
*H04N 19/70* (2014.01)
*H04N 19/625* (2014.01)
*H04N 19/124* (2014.01)
*H04N 19/423* (2014.01)

(58) Field of Classification Search
CPC ...... H04N 19/44; H04N 19/124; H04N 19/70; H04N 19/423
USPC .......................................... 382/233, 232, 238
See application file for complete search history.

(56) References Cited

U.S. PATENT DOCUMENTS

| | | | |
|---|---|---|---|
| 9,648,350 B2* | 5/2017 | Mody | H04N 19/625 |
| 2002/0172418 A1* | 11/2002 | Hu | G06T 9/00 |
| | | | 382/166 |
| 2005/0047667 A1 | 3/2005 | Ju | |
| 2006/0067582 A1* | 3/2006 | Bi | H04N 19/132 |
| | | | 382/233 |
| 2008/0158389 A1* | 7/2008 | Jeong | H04N 5/77 |
| | | | 348/231.7 |
| 2008/0310741 A1 | 12/2008 | Chen et al. | |
| 2009/0232408 A1 | 9/2009 | Meany | |
| 2013/0182757 A1 | 7/2013 | Karczewicz et al. | |
| 2014/0003530 A1 | 1/2014 | Sole Rojals et al. | |
| 2014/0086307 A1 | 3/2014 | Karczewicz et al. | |
| 2016/0021396 A1 | 1/2016 | Metzler et al. | |
| 2016/0234520 A1* | 8/2016 | Goel | H04N 19/426 |

\* cited by examiner

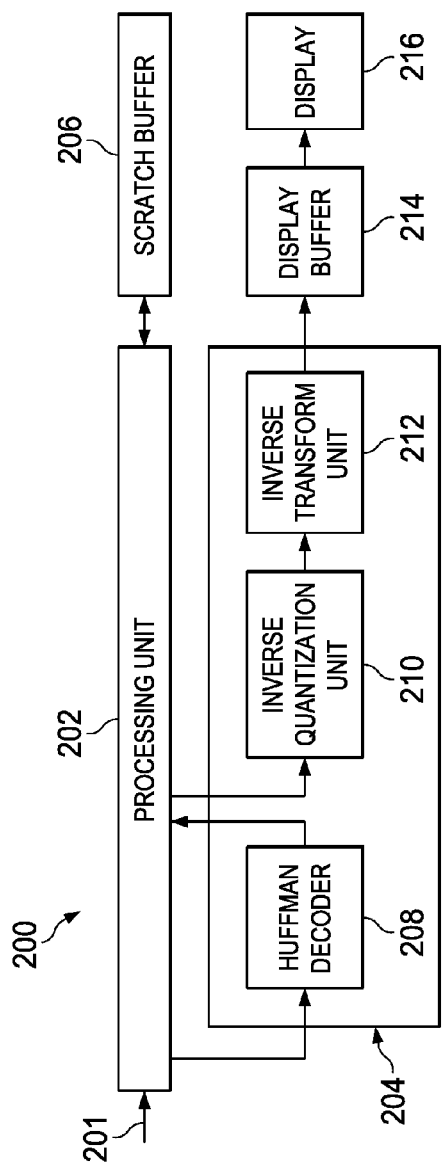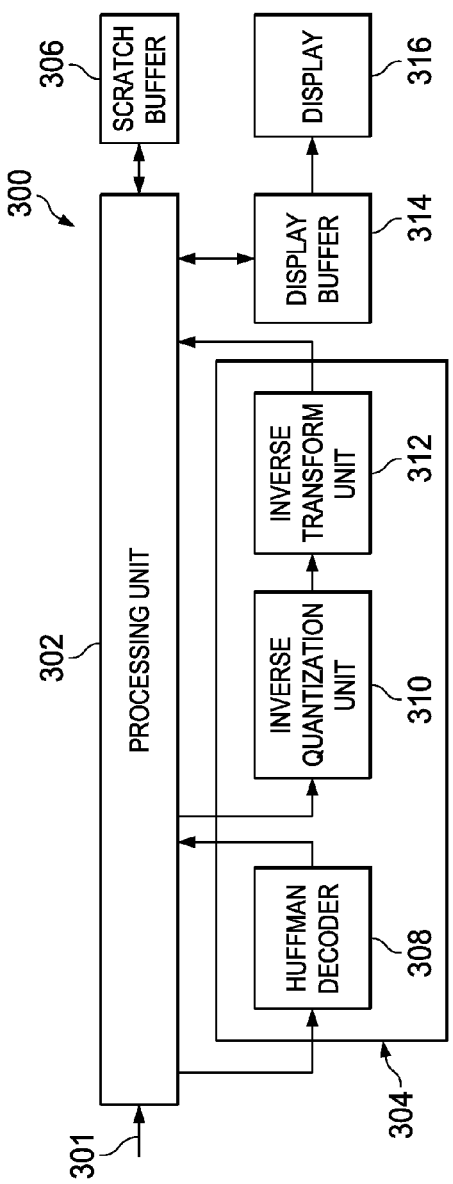

METHOD AND APPARATUS FOR DECODING A PROGRESSIVE JPEG IMAGE

CROSS REFERENCES TO RELATED APPLICATIONS

This application is a divisional application of U.S. patent application Ser. No. 14/335,099, filed Jul. 18, 2014, which application claims priority from India provisional patent application No. 3247/CHE/2013 filed on Jul. 22, 2013, both of which are hereby incorporated by reference in their entirety.

TECHNICAL FIELD

Embodiments of the disclosure relate generally to image decoding and more particularly to a method and apparatus for decoding a progressive JPEG (Joint Photographic Experts Group) image using a baseline JPEG decoder.

BACKGROUND

In 1986, the ITU (International Telegraph Union), ISO (International Organization for Standardization), industry and universities started a standardization group, the Joint Photographic Experts Group (JPEG). The goal for this group was to develop a new image compression technique. This resulted in an official standard in the beginning of the nineties. JPEG ratified a first version of a standard aimed at reducing the storage space needed for digital still pictures. The JPEG standard is widely used in processing of digital images. The processing of digital images is used in varied products ranging from digital cameras to portable video recording devices. The JPEG standard provided multiple methods for coding a JPEG image The JPEG standard provides for a baseline JPEG coding and a progressive JPEG coding. In baseline JPEG coding, the image is displayed line by line. When an image is decoded in a baseline JPEG decoder, the image will start displaying line by line from the top to the bottom of the image. In progressive JPEG coding, an image is displayed in one scan but the image is of low quality and/or blurred. As more data becomes available to a progressive JPEG decoder, the resolution of the image increases to provide a high quality image in subsequent scans.

The widespread usage of social media for image sharing has led to the popularity of progressive JPEG image format. This is because the progressive JPEG image format provides refinement of image over time on slow internet connection. Thus, an internet user will be able to see the full image as soon as the image is clicked to be displayed. However, the image would be of low quality and it is refined for better quality in iterative cycles. Typically, these progressive JPEG images are decoded by means of a software that results in increased time spent on decoding of images.

As resolution in terms of megapixels of these images increases, the time spent on decoding of images increases proportionately. The embedded devices available today have a baseline JPEG decoder support due to traditional camera capture and local playback. The baseline JPEG decoder supports decoding of baseline JPEG images only. Most available SoC's have hardware baseline decoder and addition of a progressive JPEG decoder incurs a huge cost. Thus, there is a need to decode progressive JPEG images using existing hardware solution which supports baseline JPEG image decoding and also to avoid design and development of new hardware.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides a progressive JPEG (joint photographic experts group) decoder. The progressive JPEG decoder includes a processing unit that receives a plurality of progressive scans and generates a plurality of modified progressive scans (MPSs). A baseline JPEG decoder, coupled to the processing unit, includes a Huffman decoder, an inverse quantization unit and an inverse transform unit. The Huffman decoder receives a current MPS and generates a set of transform coefficients corresponding to the current MPS.

The processing unit adds a set of transform coefficients corresponding to a previous MPS to the set of transform coefficients corresponding to the current MPS, and the processing unit generates quantization indices. The inverse quantization unit estimates inverse quantization values based on the quantization indices. The inverse transform unit estimates inverse transform decoded values based on the estimated inverse quantization values and generates a set of pixels corresponding to the current MPS.

Another embodiment provides a progressive JPEG decoder. The progressive JPEG decoder includes a processing unit that receives a plurality of progressive scans and generates a plurality of modified progressive scans (MPSs). A baseline JPEG decoder is coupled to the processing unit. The baseline JPEG decoder includes a Huffman decoder, an inverse quantization unit and an inverse transform unit. The Huffman decoder receives a current modified progressive scan (MPS) and generates a set of transform coefficients corresponding to the current MPS.

The processing unit generates a zero map and a sign map based on a set of transform coefficients corresponding to a previous MPS. The processing unit modifies the set of transform coefficients corresponding to the current MPS based on the zero map and the sign map to generate quantization indices. The processing unit updates the zero map and the sign map based on the set of transform coefficients corresponding to the current MPS. The inverse quantization unit estimates inverse quantization values based on the quantization indices, and the inverse transform unit estimates inverse transform decoded values based on the estimated inverse quantization values and generates a set of pixels corresponding to the current MPS.

Other aspects and example embodiments are provided in the Drawings and the Detailed Description that follows.

BRIEF DESCRIPTION OF THE VIEWS OF DRAWINGS

FIG. 2 illustrates a block diagram of a progressive JPEG decoder, according to an embodiment;

FIG. 3 illustrates a block diagram of a progressive JPEG decoder, according to an embodiment;

DETAILED DESCRIPTION OF THE EMBODIMENTS

Figure 1:
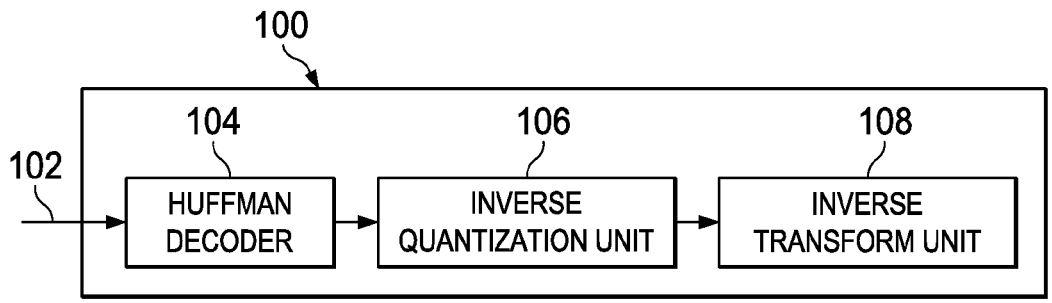
FIG. 1 illustrates a block diagram of a baseline JPEG decoder.

FIG. 1 illustrates a block diagram of a baseline JPEG decoder 100. The baseline JPEG decoder 100 receives a baseline JPEG bit-stream 102. The baseline JPEG decoder 100 includes a Huffman decoder 104 that receives the baseline JPEG bit-stream 102. The Huffman decoder 104 is coupled to an inverse quantization unit 106. The inverse quantization unit 106 is coupled to an inverse transform unit 108. The operation of the baseline JPEG decoder 100 illustrated in FIG. 1 is explained now.

A JPEG encoder divides an image in blocks of 8 by 8 pixels. These blocks are called MCUs (minimum coding units). The JPEG encoder after this division has a number of blocks which when placed in a right order forms the original image. The JPEG encoder performs transform such as discrete cosine transform on each MCU. The JPEG encoder thereafter performs quantization and Huffman encoding on these MCUs. The result of these operations is a baseline scan corresponding to an MCU and a plurality of baseline scans represents the original image in a compressed format. The baseline JPEG decoder 100 decodes the plurality of baseline scans to generate the original image. An image encoded in baseline format is a baseline JPEG image.

The baseline JPEG bit-stream 102 includes a plurality of baseline scans. Each baseline scan includes a baseline header and a plurality of MCUs. The Huffman decoder 104 receives the baseline JPEG bit-stream 102. The Huffman decoder 104 performs Huffman variable length decoding on the baseline JPEG bit-stream 102 to generate a set of transform coefficients. The inverse quantization unit 106 estimates inverse quantization values based on the set of transform coefficients. The inverse transform unit 108 estimates inverse transform decoded values based on the estimated inverse quantization values and generates a set of pixels. The set of pixels are stored in a display buffer and thereafter displayed on a display.

The baseline JPEG decoder 100 decodes a baseline scan and the set of pixels generated are displayed on the display. The image is thus generated in a line by line manner. The final output is displayed in a raster scan format.

FIG. 2 illustrates a block diagram of a progressive JPEG decoder 200, according to an embodiment. The progressive JPEG decoder 200 includes a processing unit 202. The processing unit 202 receives a plurality of progressive scans 201. A scratch buffer 206 is coupled to the processing unit 202. In one example, the scratch buffer 206 is integrated inside the processing unit 202. In another example, the scratch buffer 206 is an off-chip memory external to the progressive JPEG decoder 200 for example the scratch buffer 206 is an external DDR (double data rate) memory.

The progressive JPEG decoder 200 includes a baseline JPEG decoder 204 coupled to the processing unit 202. The baseline JPEG decoder 204 includes a Huffman decoder 208. The Huffman decoder 208 is coupled to the processing unit 202. The baseline JPEG decoder 204 also includes an inverse quantization unit 210 that is coupled to the processing unit 202. The inverse quantization unit 210 is coupled to an inverse transform unit 212. The inverse transform unit 212 in the baseline JPEG decoder 204 is coupled to a display buffer 214. In one example, the inverse transform unit 212 in the baseline JPEG decoder 204 is coupled to the processing unit 202 and the processing unit 202 is coupled to display buffer 214. In another example, the display buffer 214 is connected to the inverse transform unit 212 in the baseline JPEG decoder 204. A display 216 is coupled to the display buffer 214.

The operation of the progressive JPEG decoder 200 illustrated in FIG. 2 is explained now. The progressive JPEG decoder 200 receives a plurality of progressive scans 201. The plurality of progressive scans 201 is generated by encoding an image in a JPEG progressive format. A progressive scan of the plurality of progressive scans 201 is at least one of a spectral selection scan and a successive approximation scan.

A JPEG encoder divides an image in blocks of 8 by 8 pixels. These blocks are called MCUs (minimum coding units). The JPEG encoder after this division has a number of blocks which when placed in a right order form the original image. A JPEG encoder performs transform such as discrete cosine transform on each MCU to generate a set of transform coefficients. In spectral selection scan, the JPEG encoder encodes a defined frequency band of the transform coefficients of each MCU in one scan. In one example, a high frequency image data of an MCU is encoded first followed by a low frequency image data of the MCU. In successive approximation scan, the JPEG encoder encodes a set of bits of each transform coefficient. In an example, a specified number of MSB (most significant bits) of each transform coefficient is encoded first followed by encoding a specified number of LSB (least significant bits). An image encoded in progressive format is a progressive JPEG image.

In each of these progressive scans i.e. the spectral selection scan and the successive approximation scan, the result is a progressive scan corresponding to each MCU and a plurality of progressive scans 201 represents the original image in a compressed format. The progressive JPEG decoder 200 decodes the plurality of progressive scans 201 to generate the original image. In one example, when a baseline JPEG image is received at the progressive JPEG decoder 200, it is processed in a similar fashion as processing of one scan of a progressive JPEG image The processing unit 202 receives the plurality of progressive scans 201 and generates a plurality of modified progressives scans (MPSs). Each progressive scan of the plurality of progressive scans 201 includes a progressive header and a plurality of MCUs. The processing unit 202 converts the progressive header in each progressive scan to a baseline header. Thus, the processing unit 202 generates a plurality of MPSs and each MPS includes a baseline header and the plurality of MCUs.

The plurality of MPSs includes a current modified progressive scan (MPS) and a previous MPS. The Huffman decoder 208 receives the previous MPS followed by the current MPS. The Huffman decoder 208 receives the current MPS and generates a set of transform coefficients corresponding to the current MPS. The processing unit 202 is configured to receive the set of transform coefficients corresponding to the current MPS. The processing unit 202 stores a set of transform coefficients corresponding to the previous MPS in the scratch buffer 206.

The processing unit 202 adds the set of transform coefficients corresponding to the current MPS to the set of transform coefficients corresponding to the previous MPS. The processing unit 202 on addition generates quantization indices. The quantization indices are provided to the inverse quantization unit 210. The processing unit 202 after generation of the quantization indices erases the set of transform coefficients corresponding to the previous MPS and stores the set of transform coefficients corresponding to the current MPS in the scratch buffer 206.

The inverse quantization unit 210 estimates inverse quantization values based on the quantization indices received from the processing unit 202. The inverse transform unit 212 estimates inverse transform decoded values based on the estimated inverse quantization values and generates a set of pixels corresponding to the current MPS. In one example, the inverse transform unit 212 is an inverse discrete cosine transform unit. The set of pixels are stored in the display buffer 214 and thereafter displayed on the display 216.

The progressive JPEG decoder 200 is capable of decoding progressive JPEG images using a baseline JPEG decoder 204. When the progressive JPEG decoder 200 is not used, the entire decoding of progressive JPEG image is performed on a CPU (central processing unit) which consumes a higher number of processing cycles and also degrades the performance of a device. The progressive JPEG decoder 200 achieves high speed because of the combined functionality of the processing unit 202 and the baseline JPEG decoder 204. Thus, the progressive JPEG decoder 200 enables faster decoding of JPEG images in embedded devices that find applications in markets such as (but not limited to) smartphone market and auto infotainment market. In addition, the progressive JPEG decoder 200 enables faster refinement of images and hence, provides better visual experience to the users.

FIG. 3 illustrates a block diagram of a progressive JPEG decoder 300, according to an embodiment. The progressive JPEG decoder 300 includes a processing unit 302. The processing unit 302 receives a plurality of progressive scans 301. A scratch buffer 306 is coupled to the processing unit 302. In one example, the scratch buffer 306 is integrated inside the processing unit 302. In another example, the scratch buffer 306 is an off-chip memory external to the progressive JPEG decoder 300 for example the scratch buffer 306 is an external DDR (double data rate) memory.

The progressive JPEG decoder 300 includes a baseline JPEG decoder 304 coupled to the processing unit 302. The baseline JPEG decoder 304 includes a Huffman decoder 308. The Huffman decoder 308 is coupled to the processing unit 302. The baseline JPEG decoder 304 also includes an inverse quantization unit 310 that is coupled to the processing unit 302. The inverse quantization unit 310 is coupled to an inverse transform unit 312. The inverse transform unit 312 in the baseline JPEG decoder 304 is coupled to the processing unit 302. A display buffer 314 is coupled to the processing unit 302. In one example, the display buffer 314 is coupled to the processing unit 302 and the processing unit 302 is coupled to the inverse transform unit 312. In another example, the display buffer 314 is connected to the inverse transform unit 312 in the baseline JPEG decoder 304. A display 316 is coupled to the display buffer 314.

The operation of the progressive JPEG decoder 300 illustrated in FIG. 3 is explained now. The progressive JPEG decoder 300 receives a plurality of progressive scans 301. The plurality of progressive scans 301 is generated by encoding an image in JPEG progressive format. A progressive scan of the plurality of progressive scans 301 is at least one of a spectral selection scan and a successive approximation scan.

A JPEG encoder divides an image in blocks of 8 by 8 pixels. These blocks are called MCUs (minimum coding units). The JPEG encoder after this division has a number of blocks which when placed in a right order form the original image. A JPEG encoder performs transform such as discrete cosine transform on each MCU to generate a set of transform coefficients. In spectral selection scan, the JPEG encoder encodes a defined frequency band of the transform coefficients of each MCU in one scan. In one example, a high frequency image data of an MCU is encoded first followed by a low frequency image data of the MCU. In successive approximation scan, the JPEG encoder encodes a set of bits of each transform coefficient. In an example, a specified number of MSB (most significant bits) of each transform coefficient is encoded first followed by encoding a specified number of LSB (least significant bits).

In each of these progressive scans i.e. the spectral selection scan and the successive approximation scan, the result is a progressive scan corresponding to each MCU and a plurality of progressive scans represents the original image in compressed format. The progressive JPEG decoder 300 decodes the plurality of progressive scans 301 to generate the original image.

The processing unit 302 receives the plurality of progressive scans 301 and generates a plurality of modified progressives scans (MPSs). Each progressive scan of the plurality of progressive scans 301 includes a progressive header and a plurality of MCUs. The processing unit 302 converts the progressive header in each progressive scan to a baseline header. Thus, the processing unit 302 generates a plurality of MPSs and each MPS includes a baseline header and the plurality of MCUs.

The plurality of MPSs includes a current modified progressive scan (MPS) and a previous MPS. The Huffman decoder 308 receives the previous MPS followed by the current MPS. The Huffman decoder 308 receives the current MPS and generates a set of transform coefficients corresponding to the current MPS. The processing unit 302 is configured to receive the set of transform coefficients corresponding to the current MPS. The processing unit 302 generates a zero map and a sign map based on a set of transform coefficients corresponding to the previous MPS. The processing unit 302 modifies the set of transform coefficients corresponding to the current MPS based on the zero map and the sign map and generate quantization indices. The processing unit 302 also updates the zero map and the sign map based on the set of transform coefficients corresponding to the current MPS.

The processing unit 302 stores the zero map and the sign map corresponding to the previous MPS in the scratch buffer 306. The processing unit 302 after generation of the quantization indices updates the zero map and the sign map stored in the scratch buffer 306 based on the set of transform coefficients corresponding to the current MPS.

The inverse quantization unit 310 estimates inverse quantization values based on the quantization indices received from the processing unit 302. The inverse transform unit 312 estimates inverse transform decoded values based on the estimated inverse quantization values and generates a set of pixels corresponding to the current MPS. In one example the inverse transform unit 312 is an inverse discrete cosine transform unit.

A set of pixels corresponding to the previous MPS is stored in the display buffer 314. The processing unit 302 is configured to receive the set of pixels corresponding to the current MPS from the inverse transform unit 312 and receive the set of pixels corresponding to the previous MPS from the display buffer 314. The processing unit 302 adds the set of pixels corresponding to the current MPS and the set of pixels corresponding to the previous MPS to generate a set of absolute pixels. The processing unit 302 stores the set of absolute pixels in the display buffer 314. The set of absolute pixels are thereafter displayed on the display 316.

The progressive JPEG decoder 300 is capable of decoding progressive JPEG images using a baseline JPEG decoder 304. When the progressive JPEG decoder 300 is not used, the entire decoding of progressive JPEG image is performed on a CPU (central processing unit) which consumes a higher number of processing cycles and also degrades the performance of a device. The progressive JPEG decoder 300 achieves high speed because of the combined functionality of the processing unit 302 and the baseline JPEG decoder 304. Thus, the progressive JPEG decoder 300 enables faster decoding of JPEG images in embedded devices that find applications in markets such as (but not limited to) smartphone market and auto infotainment market.

Also, the progressive JPEG decoder 300 achieves memory optimization through the use of the sign map and the zero map. Thus, the progressive JPEG decoder 300 is very useful in application where memory is at a premium. In one embodiment, a memory storage requirement is 2 bits per pixel in the progressive JPEG decoder 300 while the memory storage requirement is 16 bits per pixel in the progressive JPEG decoder 200. Thus, the progressive JPEG decoder 300 reduces the memory requirement by 7/8 of the progressive JPEG decoder 200. This is further illustrated in connection with FIG. 4.

Figure 4:
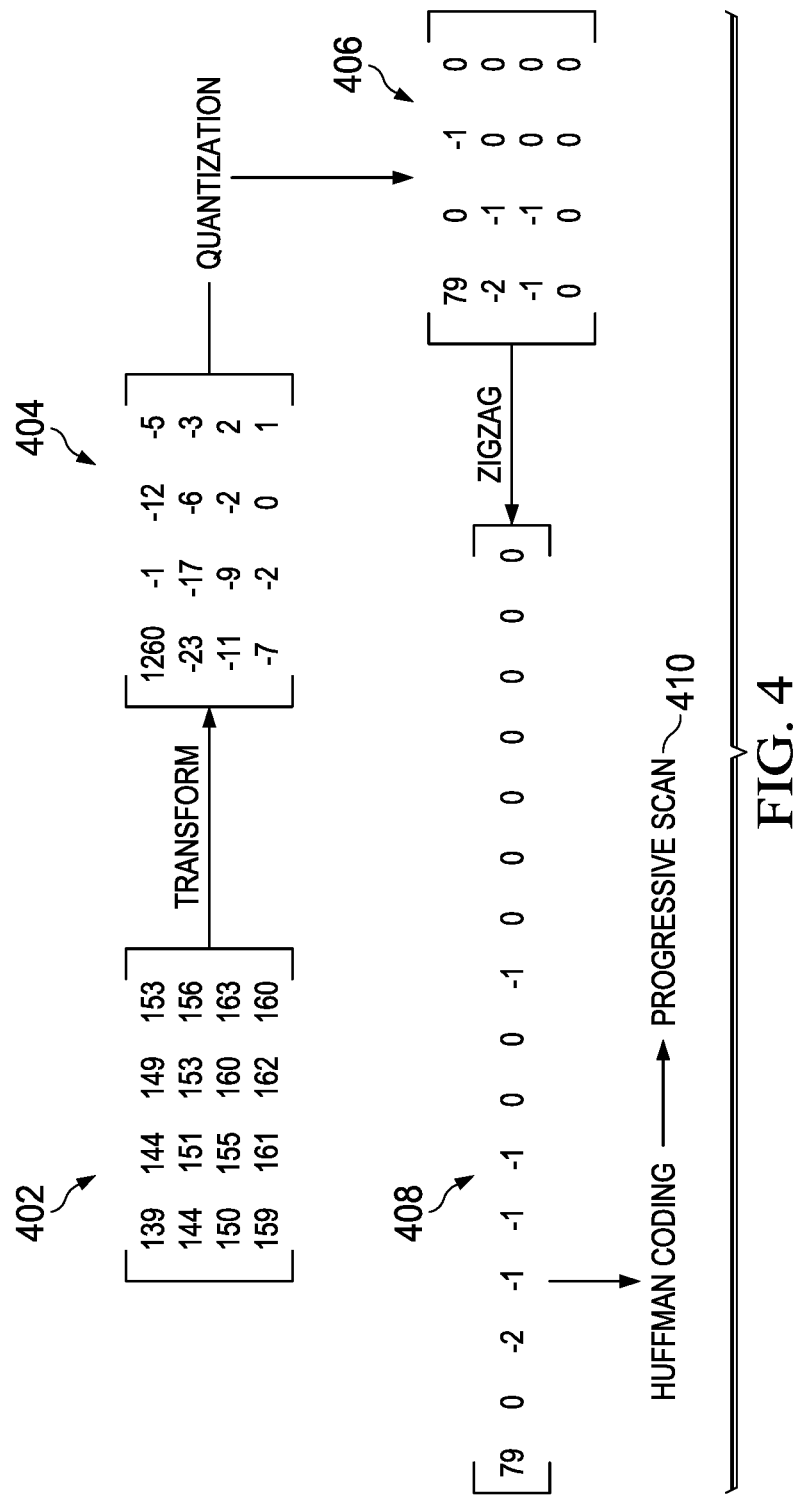
FIG. 4 is an example to illustrate encoding and decoding of an image, according to an embodiment.

FIG. 4 is an example to illustrate encoding and decoding of an image, according to an embodiment. A JPEG encoder divides an image in blocks of 8 by 8 pixels. These blocks are called MCUs (minimum coding units). Thus, an image is divided in a plurality of MCUs. 402 represent one MCU of the plurality of MCUs, according to one example embodiment. The MCU 402 is represented as a matrix of 4 by 4 pixels for ease of explanation and is understood not to limit the scope of this disclosure. Each element in the matrix represents a pixel. An image would be divided into plurality of such MCU's.

The JPEG encoder performs transform such as discrete cosine transform on each MCU. The JPEG encoder performs transform on MCU 402 and generates a set of transform coefficients which are represented as block 404. The JPEG encoder performs quantization on block 404 to generate block 406. The JPEG encoder aligns the transform coefficients of block 406 in a zigzag order to generate a scan 408. The JPEG encoder thereafter performs Huffman coding on the scan 408 to generate a progressive scan 410 corresponding to the MCU 402. It is to be noted that the JPEG encoder will generate a progressive scan for each MCU of the plurality of MCUs.

The progressive scan 410 is at least one of a spectral selection scan and a successive approximation scan. In spectral selection scan, the JPEG encoder encodes a defined frequency band of the transform coefficients of each MCU in one scan. In one example, a high frequency image data of an MCU is encoded first followed by a low frequency image data of the MCU. For example, for scan 408, the JPEG encoder will encode and transmit [79, 0] in the first progressive scan followed by [−2 −1 −1] in the second progressive scan. As an example, during the spectral scan, the JPEG encoder will transmit first two transform coefficients of each MCU of the plurality of MCUs in the first progressive scan. This is followed by transmitted next three transform coefficients of each MCU of the plurality of MCUs in the second progressive scan.

In successive approximation scan, the JPEG encoder encodes a set of bits of each transform coefficient. In an example, a specified number of MSB (most significant bits) of each transform coefficient is encoded first followed by encoding a specified number of LSB (least significant bits). For example, the scan 408 is represented in the form of bits and the JPEG encoder will encode and transmit a specified number of MSB of each transform coefficients in the scan 408. This is explained further in connection with Table 1.

Table 1 illustrates decoding of a progressive scans by a progressive JPEG decoder 300, according to an embodiment.

TABLE 1

| Scan | 79 | 0 | −2 | −1 | −1 | −1 | 0 | 0 |
|---|---|---|---|---|---|---|---|---|
| Bit representation | 010011101 | 00000000 | 0000100 | 00000001 | 00000001 | 00000001 | 00000000 | 00000000 |
| First Progressive Scan | 0100 | 0000 | 0000 | 0000 | 0000 | 0000 | 0000 | 0000 |
| Pixel values | 64 | 0 | 0 | 0 | 0 | 0 | 0 | 0 |
| Sign Map | 0 | 0 | 0 | 0 | 0 | 0 | 0 | 0 |
| Zero Map | 1 | 0 | 0 | 0 | 0 | 0 | 0 | 0 |
| Second Progressive Scan | 111 | 000 | 010 | 0000 | 0000 | 0000 | 0000 | 0000 |
| Pixel values | 14 | 0 | −2 | 0 | 0 | 0 | 0 | 0 |
| Sign Map | 0 | 0 | 0 | 0 | 0 | 0 | 0 | 0 |
| Zero Map | 1 | 0 | 1 | 0 | 0 | 0 | 0 | 0 |
| Third Progressive Scan | 1 | 0 | 0 | 1 | 1 | 1 | 0 | 0 |
| Pixel values | 1 | 0 | 0 | 1 | 1 | 1 | 0 | 0 |
| Sign Map | 0 | 0 | 1 | 1 | 1 | 1 | 0 | 0 |
| Zero Map | 1 | 0 | 1 | 1 | 1 | 1 | 0 | 0 |
| Scan | −1 | 0 | 0 | 0 | 0 | 0 | 0 | 0 |
| Bit representation | 00000001 | 00000000 | 00000000 | 00000000 | 00000000 | 00000000 | 00000000 | 00000000 |
| First Progressive Scan | 0000 | 0000 | 0000 | 0000 | 0000 | 0000 | 0000 | 0000 |
| Pixel values | 0 | 0 | 0 | 0 | 0 | 0 | 0 | 0 |
| Sign Map | 0 | 0 | 0 | 0 | 0 | 0 | 0 | 0 |
| Zero Map | 0 | 0 | 0 | 0 | 0 | 0 | 0 | 0 |
| Second Progressive Scan | 0000 | 0000 | 0000 | 0000 | 0000 | 0000 | 0000 | 0000 |
| Pixel values | 0 | 0 | 0 | 0 | 0 | 0 | 0 | 0 |
| Sign Map | 0 | 0 | 0 | 0 | 0 | 0 | 0 | 0 |
| Zero Map | 0 | 0 | 0 | 0 | 0 | 0 | 0 | 0 |
| Third Progressive Scan | 1 | 0 | 0 | 0 | 0 | 0 | 0 | 0 |
| Pixel values | 1 | 0 | 0 | 0 | 0 | 0 | 0 | 0 |
| Sign Map | 1 | 0 | 0 | 0 | 0 | 0 | 0 | 0 |
| Zero Map | 1 | 0 | 0 | 0 | 0 | 0 | 0 | 0 |

The scan illustrated in first row of Table 1 is similar to the scan 408 illustrated as an example in FIG. 4. The second row of Table 1 is a bit representation of each transform coefficients of the scan. During a successive approximation scan, a specified number of MSB (most significant bits) of each transform coefficient is encoded first followed by encoding a specified number of LSB (least significant bits). In table 1, a first four bits of the transform coefficients are encoded in the first progressive scan followed by the next three bits in the second progressive scan and a last bit in the third progressive scan. For example, corresponding to transform coefficient 79, 0100 is encoded in the first progressive scan, 111 is encoded in the second progressive scan and 1 is encoded in the last progressive scan.

The progressive JPEG decoder 300 receives a plurality of progressive scans which includes the first, second and third progressive scans. It is to be noted that the scan 408 is corresponding to the MCU 402 and that the progressive JPEG decoder 300 will receive scans corresponding to each MCU of the plurality of MCUs in each progressive scan. The progressive JPEG decoder 300 generates a zero map and a sign map corresponding to the first progressive scan. In one example, the sign map stores a 1 to indicate that a sign of a transform coefficient of the set of transform coefficients is negative and the sign map stores a 0 to indicate that the sign of the transform coefficient is positive.

In another example, the zero map stores a 1 to indicate if a value of a transform coefficient of the set of transform coefficients is non-zero and the zero map stores a 0 to indicate if the value of the transform coefficient is zero.

The progressive JPEG decoder 300 generates the sign map and the zero map based on the received first progressive scan. As illustrated in Table 1, the sign map shows 0 corresponding to a set of bits received in the first progressive scan thus indicating that the transform coefficients are positive. The zero map illustrates a 1 corresponding to the bits received for the transform coefficient '79' since the bits have non-zero value. The values corresponding to the other transform coefficients in the zero map are zero since the bits have zero values. Pixel values represent an integer equivalent to the bits represented in the progressive scan.

Similarly, when 111 is received in the second progressive scan corresponding to the transform coefficient '79', the sign map is updated as 0 (as the transform coefficient is positive) and the zero map is 1 to indicate a non-zero value. For the transform coefficient '−2', the sign map is updated as 1 to indicate that the transform coefficient is negative and the zero map is updated as 1. When a non-zero value is received for the first time corresponding to a transform coefficient, the received progressive scan includes a set of bits to indicate if the transform coefficient is positive or negative.

In the third progressive scan, the sign map is updated as 0 and the zero map is updated as 1 for the bit 1 received corresponding to the transform coefficient '79'. On adding 64, 14 and 1, the final pixel value which is '79' is obtained. This addition is performed in a processing unit in the progressive JPEG decoder 300. The progressive JPEG decoder 300 achieves memory optimization with the use of the sign map and the zero map since only 1 bit per pixel is required to be stored for the sign map and 1 bit per pixel is required to be stored for the zero map. Thus, the progressive JPEG decoder 300 is not required to store the transform coefficient corresponding to each MCU which reduces the memory requirement drastically.

Also, the progressive JPEG decoder 300 modifies the set of transform coefficient corresponding to the second progressive scan based on the zero map and the sign map generated based on the transform coefficients corresponding to the first progressive scan. The progressive JPEG decoder 300 determines a position and a sign of a transform coefficient and also determines corresponding bits stored in the zero map and the sign map at the same position as the transform coefficient. The progressive JPEG decoder 300 changes the sign of the transform coefficient when the value of the bit stored in the zero map is 1 and the value of bit stored in the sign map is also 1.

Figure 5:
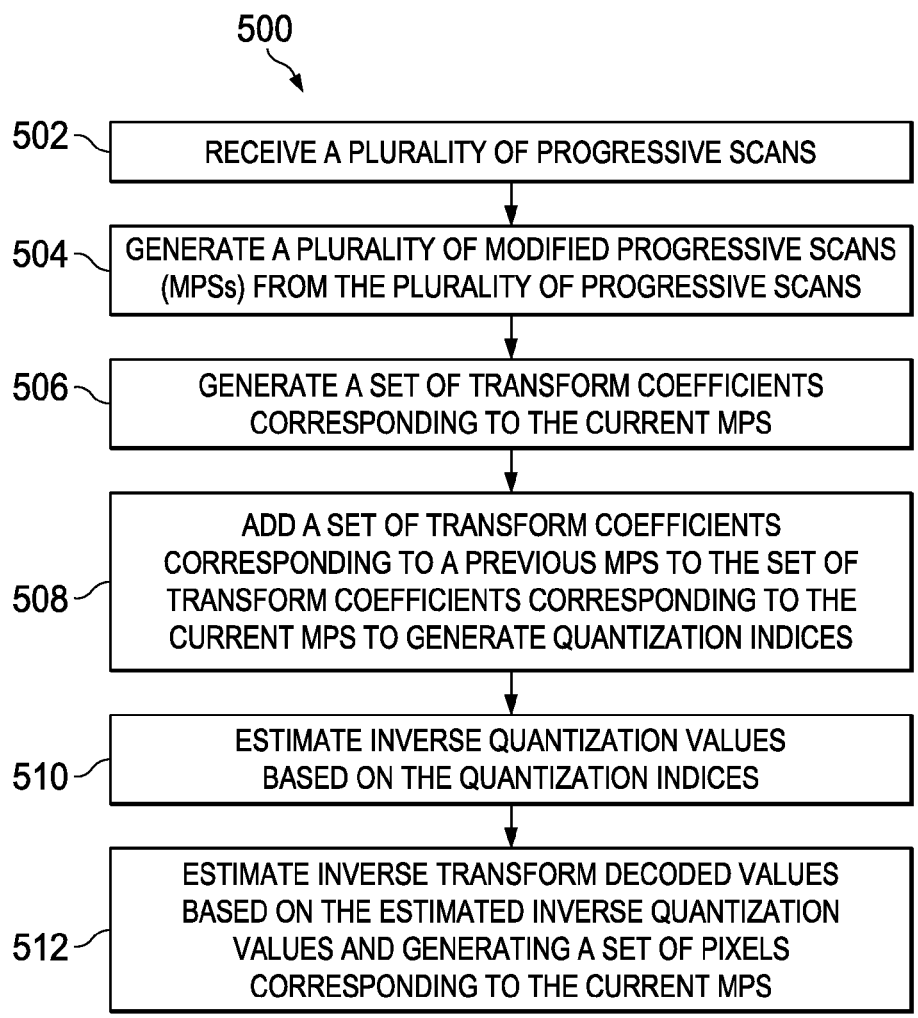
FIG. 5 illustrates a flowchart of a method of decoding a progressive JPEG image, according to an embodiment.

FIG. 5 illustrates a flowchart 500 of a method of decoding a progressive JPEG image, according to an embodiment. In one example, the progressive JPEG image is decoded by a progressive JPEG decoder 200 that uses a baseline JPEG decoder 204 (illustrated in FIG. 2). At step 502, a plurality of progressive scans is received. The plurality of progressive scans forms the progressive JPEG image. At step 504, a plurality of modified progressive scans (MPSs) is generated from the plurality of progressive scans. Each progressive scan of the plurality of progressive scans includes a progressive header and a plurality of MCUs. The progressive header in each progressive scan is converted to a baseline header. Thus, each MPS includes a baseline header and the plurality of MCUs. The plurality of MPSs includes a current modified progressive scan (MPS) and a previous MPS.

At step 506, a set of transform coefficients corresponding to the current MPS is generated. The set of transform coefficients corresponding to the current MPS is added to the set of transform coefficients corresponding to the previous MPS, at step 508, to generate quantization indices. At step 510, inverse quantization values are estimated based on the quantization indices. The inverse transform decoded values are estimated based on the estimated inverse quantization values and a set of pixels corresponding to the current MPS is generated at step 512. In one example the inverse transform is an inverse discrete cosine transform.

Figure 6:
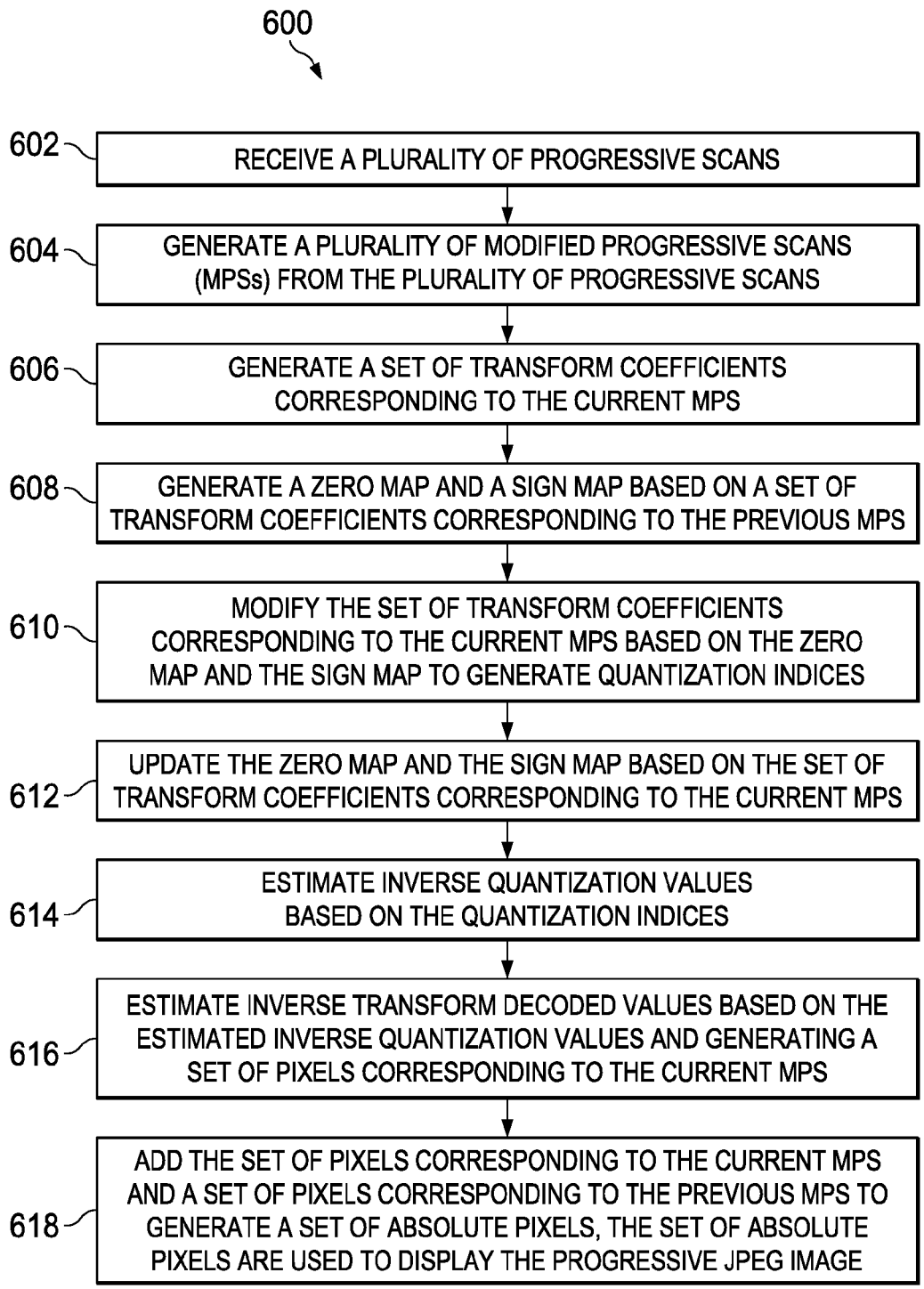
FIG. 6 illustrates a flowchart of a method of decoding a progressive JPEG image, according to an embodiment.

FIG. 6 illustrates a flowchart 600 of a method of decoding a progressive JPEG image, according to an embodiment. In one example, the progressive JPEG image is decoded by a progressive JPEG decoder 300 that uses a baseline JPEG decoder 304 (illustrated in FIG. 3). At step 602, a plurality of progressive scans is received. The plurality of progressive scans forms the progressive JPEG image. At step 604, a plurality of modified progressive scans (MPSs) is generated from the plurality of progressive scans. Each progressive scan of the plurality of progressive scans includes a progressive header and a plurality of MCUs. The progressive header in each progressive scan is converted to a baseline header. Thus, each MPS includes a baseline header and the plurality of MCUs. The plurality of MPSs includes a current modified progressive scan (MPS) and a previous MPS.

At step 606, a set of transform coefficients corresponding to the current MPS is generated. A zero map and a sign map are generated based on a set of transform coefficients corresponding to the previous MPS, at step 608. The set of transform coefficients corresponding to the current MPS are modified based on the zero map and the sign map, at step 610, to generate quantization indices. At step 612, the zero map and the sign map are updated based on the set of transform coefficients corresponding to the current MPS.

At step 614, inverse quantization values are estimated based on the quantization indices. The inverse transform decoded values are estimated based on the estimated inverse quantization values and a set of pixels corresponding to the current MPS are generated at step 616. In one example, the inverse transform is an inverse discrete cosine transform. At step 618, the set of pixels corresponding to the current MPS are added to the set of pixels corresponding to the previous MPS to generate a set of absolute pixels. The set of absolute pixels are used to display the progressive JPEG image.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A progressive Joint Photographic Experts Group (JPEG) decoder comprising
   a processing unit configured to receive a plurality of progressive scans and configured to generate a plurality of modified progressive scans (MPSs);
   a baseline JPEG decoder coupled to the processing unit, the baseline JPEG decoder comprising:
      a Huffman decoder configured to receive a current modified progressive scan (MPS) and configured to generate a set of transform coefficients corresponding to the current MPS, wherein the processing unit is configured to add a set of transform coefficients corresponding to a previous MPS to the set of transform coefficients corresponding to the current MPS, and the processing unit is configured to generate quantization indices;
      an inverse quantization unit configured to estimate inverse quantization values based on the quantization indices; and
      an inverse transform unit configured to estimate inverse transform decoded values based on the estimated inverse quantization values and configured to generate a set of pixels corresponding to the current MPS.

2. The progressive JPEG decoder of claim 1, wherein the plurality of progressive scans is generated by encoding an image in JPEG progressive format, and wherein the plurality of MPSs comprises the current MPSs and the previous MPS.

3. The progressive JPEG decoder of claim 1, wherein the Huffman decoder receives the previous MPS followed by the current MPS.

4. The progressive JPEG decoder of claim 1, wherein each progressive scan of the plurality of progressive scans comprises a progressive header and a plurality of minimum coding units (MCUs).

5. The progressive JPEG decoder of claim 4, wherein the processing unit on receiving the plurality of progressive scans is configured to convert the progressive header in each progressive scan to a baseline header such that each MPS of the plurality of MPSs comprises the baseline header and the plurality of MCUs.

6. The progressive JPEG decoder of claim 1 further comprising a scratch buffer coupled to the processing unit, wherein the processing unit is configured to store the set of transform coefficients corresponding to the previous MPS in the scratch buffer.

7. The progressive JPEG decoder of claim 6, wherein when the processing unit generates the quantization indices, the processing unit is configured to erase the set of transform coefficients corresponding to the previous MPS and configured to store the set of transform coefficients corresponding to the current MPS in the scratch buffer.

8. The progressive JPEG decoder of claim 1, wherein the inverse transform unit is an inverse discrete cosine transform unit.

9. The progressive JPEG decoder of claim 1 further comprising:
   a display buffer coupled to the baseline JPEG decoder and configured to store the set of pixels corresponding to the current MPS; and
   a display coupled to the display buffer and configured to display the image.

10. The progressive JPEG decoder of claim 9, wherein the display buffer is connected to the inverse transform unit in the baseline JPEG decoder.

11. The progressive JPEG decoder of claim 9, wherein the inverse transform unit in the baseline JPEG decoder is coupled to the processing unit and the display buffer is coupled to the processing unit.

12. A method of decoding a progressive Joint Photographic Experts Group (JPEG) image using a baseline JPEG decoder comprising:
   receiving a plurality of progressive scans, the plurality of progressive scans form the progressive JPEG image;
   generating a plurality of modified progressive scans (MPSs) from the plurality of progressive scans, the plurality of MPSs comprises a current MPS and a previous MPS;
   generating a set of transform coefficients corresponding to the current MPS;
   adding a set of transform coefficients corresponding to a previous MPS to the set of transform coefficients corresponding to the current MPS to generate quantization indices;
   estimating inverse quantization values based on the quantization indices; and estimating inverse transform decoded values based on the estimated inverse quantization values and generating a set of pixels corresponding to the current MPS.

13. The method of claim 12, wherein each progressive scan of the plurality of progressive scans comprises a progressive header and a plurality of minimum coding units (MCUs).

14. The method of claim 13, wherein generating the plurality of MPSs further comprises converting the progressive header in each progressive scan of the plurality of progressive scans to a baseline header such that each MPS of the plurality of MPSs comprises the baseline header and the plurality of MCUs.

\* \* \* \* \*